UNITED STATES PATENT OFFICE 2,588,358

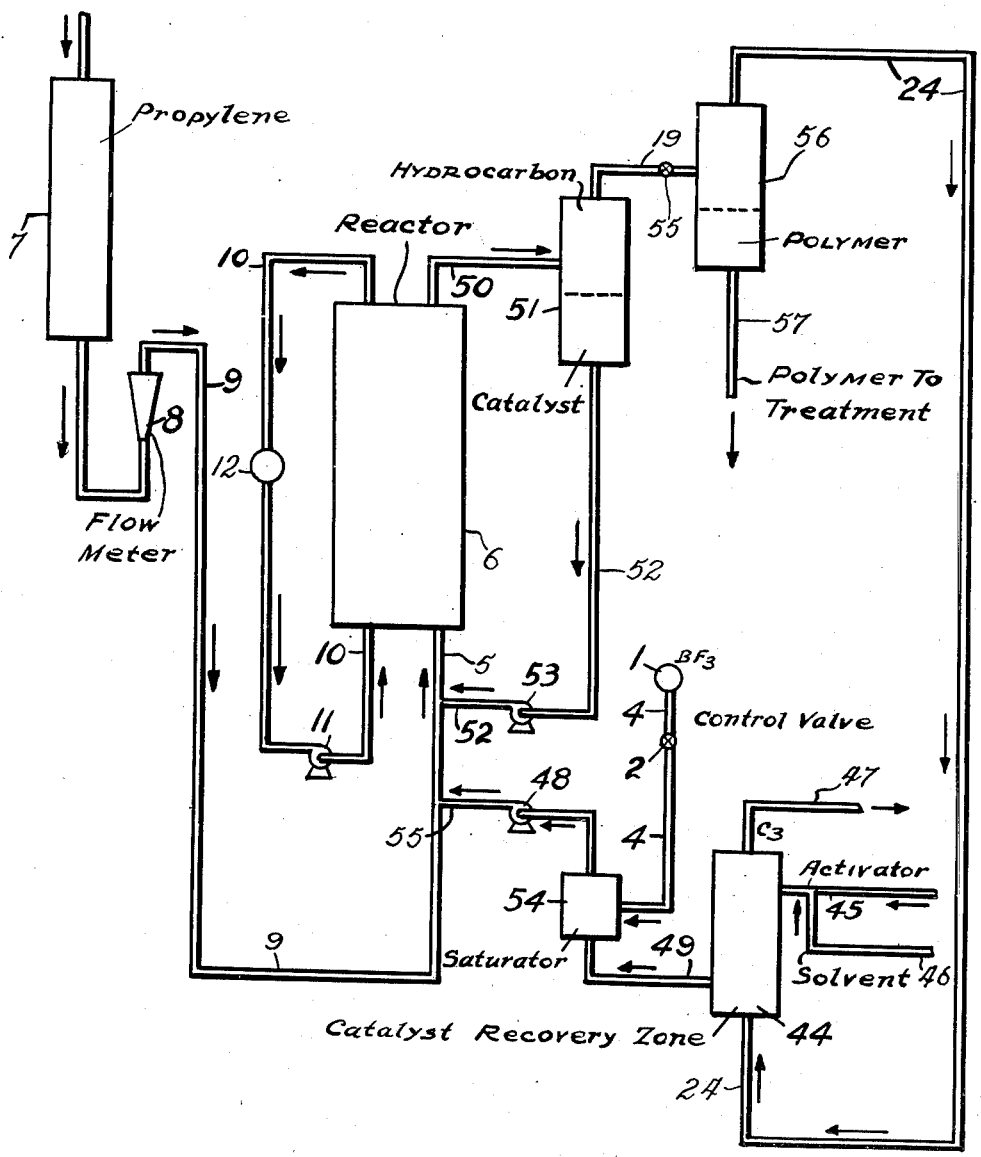

PROCESS FOR POLYMERIZATION OF PROPYLENE WITH LIQUID CATALYST COMPLEX

Carl S. Carlson and Robert S. Merrington, Elizabeth, and Frank A. Biribauer, Cranford, N. J., assignors to Standard Oil Development Company, a corporation of Delaware Application April 22, 1948, Serial No. 22,586

1 Claim. (Cl. 260—683.15)

This invention relates to an improved process for the selective production of valuable low molecular weight propylene polymers. More particularly, it is concerned with an improvement in the method of effecting and controlling the polymerization of propylene in the presence of a Friedel-Crafts type catalyst in a process designed to obtain a high conversion of the propylene monomer to propylene polymers containing 9 to 24 carbon atoms per molecule.

Propylene has been polymerized by a process in which water and oxygen-containing polar organic compounds are used in small proportions as activators under suitable conditions in regulated quantities for obtaining high yields of $C_9$ to $C_{24}$ propylene polymers during a controlled catalytic polymerization of propylene.

The oxygen-containing polar organic compounds used for obtaining the controlled catalytic polymerization of propylene belong to many classes of oxygenated organic compounds, such as ethers, alcohols, ketones, aldehydes, acids and esters. In addition, the organic OH and C compounds may contain other substituents such as nitrogen, sulfur, or halogens. Poly-functional compounds such as glycols, glycerine, polyglycol ethers, keto acids and the like have also been employed to control the polymerization of propylene. Water may also be used to control the reaction.

The oxygen-containing polar organic compound is admixed in a properly adjusted small quantity, to bring about polymerization of the propylene to a controlled level in the conventional process.

The propylene feed consists of substantially pure propylene, or may be a mixture containing $C_1$ to $C_3$ hydrocarbons as in light refinery gases, or a mixture of essentially propane-propylene such as is found in a refinery propane-propylene cut. The propylene feed may also be diluted with higher paraffinic hydrocarbons such as butanes, pentanes and hexanes which are inert under the reaction conditions.

Polymerization reaction conditions suitable for the controlled polymerization of propylene to its $C_9$ to $C_{24+}$ polymers are such that in the absence of the activator, the catalyst fails to effect formation of these polymers in any substantial yield at operative time intervals and pressures. The propylene undergoing the controlled polymerization is preferably maintained in liquid phase at temperatures ranging from 0° C. to 91.4° C. by applying sufficient pressure in the range of 10 to 750 atmospheres or higher.

The catalyst employed in the controlled polymerization of propylene is boron fluoride, which effects little or no substantial polymerization of liquid propylene at temperatures between 0–100° C. in intervals such as an hour in the absence of the oxygen-containing compounds used as an activator. The $BF_3$ is conventionally fed to the reaction zone as a gas.

The amount of the $BF_3$ catalyst required varies from a small quantity, i. e., 1 mol percent with respect to the propylene feed to an equi-molar proportion or higher. An increase in the amount of catalyst has the effect of speeding up the polymerization. Very rapid selective polymerization of propylene has been obtained with the catalyst in a larger molar proportion than the propylene feed, and this effectiveness of the catalyst depends on the extent to which the catalyst is maintained in intimate contact with the feed.

There are some distinct advantages therefore to be obtained by the use of the higher concentrations of catalyst. The use of the increased quantities of this expensive catalyst, however, greatly increases the cost of the operation. In addition, the normal catalyst losses are greatly multiplied by the use of these larger quantities. The cost of the process would be considerably reduced by a more efficient means of catalyst utilization.

An object of this invention is to provide a continuous process for the catalytic polymerization of propylene wherein the total amount of catalyst used for optimum operation is substantially reduced. Another object is to provide a process wherein the catalyst losses are rendered almost negligible, while the propylene conversion is kept at a high level. Still another object is to provide a process employing a rapid, inexpensive means of catalyst recovery.

It has now been found that a propylene polymerization process employing the $BF_3$ combined with the activator compound in the form of a liquid catalyst complex is ideally adapted to attain the before-mentioned objects.

These liquid $BF_3$ activated complexes are formed when many of the before-mentioned activators are employed in substantially larger quantities than has been done heretofore in similar polymerization processes. The molar ratio of activator to $BF_3$ as used in this invention may be as much as one or slightly higher. The controlling limit is the saturation point of $BF_3$ in the activator. The vapor pressure of $BF_3$ is low when its concentration is slightly below the saturation point and the $BF_3$ losses are consequently also low.

Inasmuch as in all cases, the activating ability of the complex formed depends on the oxygenated or non-hydrocarbon radical it is probable that most homologs of the catalyst complex-forming compounds also form catalytically active complexes with $BF_3$. The physical characteristics of the complex, such as solubility, melting point, boiling point, and in some cases, stability, depend on the hydrocarbon part of the molecule.

Those activators, which form solids with $BF_3$ are, when dissolved in suitable solvents, good liquid catalysts. All the activators which alone or with auxiliary solvents form liquid complexes can be used in the process of this invention.

Listed below are examples and data on $BF_3$-activator liquid catalyst complexes:

$BF_3$—*activator liquid catalyst complexes—atmospheric pressure—20° C.*

| Class | Material | Mol $BF_3$ per Mol Material at Saturation | Characteristics— Physical State |
|---|---|---|---|
| Ethers | n-Butyl ether | 1.03 | Liquid. |
|  | Beta, Beta'-dichlorodiethyl ether | 0.85 | Do. |
|  | n-Amyl ether | 1.02 | Do. |
| Alcohols | Methanol | 0.994 | Do. |
|  | Ethanol | 0.930 | Do. |
|  | Isopropanol | 0.891 | Dehydrates [1]. |
|  | n-Amyl alcohol | 0.826 | Liquid. |
|  | iso-Amyl alcohol | 0.869 | Do. |
|  | sec-Amyl alcohol | 0.704 | Dehydrates [1]. |
|  | tert.-Amyl alcohol | 0.555 | Do.[1] |
|  | Lauryl alcohol | 1.02 | Liquid. |
| Esters | n-Propyl acetate | 1.04 | Do. |
|  | sec-Butyl acetate | 1.02 | Do. |
|  | n-Amyl propionate | 0.959 | Do. |
|  | Ethyl Oxalate | 0.454 | Do. |
|  | Ethyl Sulfate | 0.402 | Do. |
| Misc | Nitroethane | 0.183 | Do. |
|  | n-Amyl mercaptan |  | Forms complex very slowly. |
|  | Benzyl mercaptan |  | Do. |

[1] Less desirable than stable complexes for use in this invention.

This invention will be better understood from the following discussion of a specific embodiment.

In the flow diagram, a unit is illustrated in which this invention is used showing control of the continuous polymerization of propylene. Referring to the drawing, gaseous $BF_3$ catalyst is supplied from tank 1 through flow control valve 2 in line 4 to saturator 54 where the $BF_3$ forms a liquid catalyst complex with the activator. The liquid catalyst complex leaves saturator 54 through line 55 and is pumped by pump 48 to inlet 5 where it enters the reactor 6. Liquefied propylene feed is supplied from tank 7 through flow meter 8 in line 9 to inlet 5 of the reactor 6. The mixture of liquid catalyst complex and propylene feed flows into the reactor 6; a portion of the resulting reaction mixture is recirculated from the outlet end of the reactor 6 through line 10 by pump 11 back to the reactor 6; and during the recycling, the mixture is passed through a heat exchanger 12 wherein the recirculated mixture is brought back to approximately the reaction zone temperature.

After the unit is brought into operation, a portion of the mixture reaching the outlet end of reactor 6 is passed through overflow line 50 into a high pressure decanter 51 where a two layer separation takes place into $BF_3$ activator liquid complex, and a hydrocarbon layer consisting of unconverted propylene, other hydrocarbons, polypropylene and some dissolved $BF_3$. The pressure in separator 51 is sufficient to maintain the $C_3$ hydrocarbons in the liquid phase or dissolved in the hydrocarbon reaction products, and is conveniently at least 10 atmospheres. The $BF_3$ liquid catalyst complex layer is recycled through line 52 by pump 53 to line 5 and back to the reactor 6.

The hydrocarbon layer is withdrawn from the decanter 51 through line 19 and pressure reducing valve 55 to a separator 56, maintained at a reduced pressure which conveniently may be at atmospheric pressure. The polypropylene polymers are withdrawn from separator 56 through line 57 as bottoms for purification elsewhere. The gaseous products consisting of propane, propylene, lower boiling hydrocarbons, and small amounts of $BF_3$ which may have been dissolved in the polymer are taken off overhead from separator 56 through line 24 to catalyst recovery zone 44. The liquid catalyst complex forming activator is fed into catalyst recovery zone 44 by line 45. Auxiliary solvent materials can be fed into the catalyst recovery zone by line 46. The $BF_3$ is thus absorbed in the activator liquid and pumped through line 49 to saturator 54 where additional $BF_3$ can be added as needed.

Propylene and other gases are taken off from catalyst recovery zone 44 through line 47 and may be recycled to reactor 6 as desired.

In a preferred mode of operating a continuous unit for preparing the low molecular weight propylene polymers, liquid propylene is admixed at a constant feed rate with the liquid catalyst complex; the resulting reaction mixture is recirculated through the reaction zone, as in reactor 6 while exothermic heat of reaction is removed to establish steady reaction conditions; then while steady reaction conditions are maintained liquid polymer oil is withdrawn, e. g., through overflow pipe 50, from the reaction zone continuously at a lower volumetric rate that the volumetric feed rate of the liquid propylene continuously entering the inlet 5 of the reactor 6. For example, under steady reaction conditions in the continuous liquid phase operation at near 100% conversion, with a liquid propylene feed rate of 0.75 vol. per vol. of reaction zone per hour, the polymer oil product is withdrawn at about two-thirds that rate, i. e., at a rate of 0.5 vol. per vol. of reaction zone per hour.

The propylene feed and the liquid catalyst complex may enter the reaction zone as separate streams. The activating compound may be added continuously or intermittently in separate streams or with the other feed streams.

Although the preferred commercial operation is a continuous liquid phase system as described, semi-continuous systems may be used. Inert diluents may also be fed to the system if desired.

Experimental data were obtained in the production of propylene polymer by the method of this invention and are presented in the following examples:

Example I

A one litre continuous reactor was filled with diethyl ether and $BF_3$ was added under 200 lb. per square inch pressure up to saturation. The weight of the $BF_3$ was 320 gms. The $BF_3$ was turned off and liquid propylene feed containing 86% propylene was fed into the system at the rate of one litre per hour. The temperature of the reactor was kept between 18 and 32° C. After 6 hours the conversion level dropped appreciably but was restored by the addition of 15 grams of $BF_3$. After another 2 hours had elapsed, the conversion level started falling off but was again restored by the addition of an additional 15 grams of $BF_3$. The run was continued with no further addition of $BF_3$ until 11½ hours had elapsed since the start. The incremental 30 grams of $BF_3$ yielded 2265 gms. of polymer or 76 gms. polymer per gram $BF_3$. This illustrates the importance of maintaining the $BF_3$ liquid catalyst complex at or near the saturation point. The average conversion over this period of time was better than 90% based on the propylene in the feed.

Example II

A one litre continuous reactor was filled with diethyl ether and $BF_3$ was added under 200 lbs. per square inch pressure up to saturation. $BF_3$ was turned off and a liquid propylene feed containing 86% propylene and 1% diisopropyl ether was fed into the system at the rate of one litre per hour. The temperature of the reactor was kept between 19 and 40° C. After 5½ hours, it was necessary because of decreasing conversion to refortify the catalyst with more $BF_3$. The run continued for a total of 8 hours without further addition of $BF_3$. The average conversion over this period of time was above 80%, based on the propylene in the feed. A clear phase separation was visible, even under the rather turbulent conditions in the separator, and a water white polymer resulted.

The polymers obtained as a result of the process of this invention contain mainly $C_9$ to $C_{24}$ polymers as contrasted to the much higher molecular weight polymers obtained through the use of $BF_3$ and oxygen containing compounds in the polymerization of isobutylenes. The lower molecular weight polymers of this invention have specific commercial uses i. e. in lube oil additives, detergents, cable oils and plasticizers. The controlled polymerization to the $C_9$ to $C_{24}$ polymers is therefore very desirable. It is to be understood that the term selectively polymerizing as used herein refers to the production mainly of these $C_9$ to $C_{24}$ polymers.

As previously pointed out when the $BF_3$ activator complex is a solid, auxiliary solvents have to be employed. These auxiliary solvents preferably are also liquid catalyst complexes of the gaseous material with another activator. In addition, when the auxiliary solvent is itself an activator, thus creating a ternary system of catalyst complex, an activity can be obtained which is greater than the sum of the activities of the complexes of $BF_3$ with each activator separately. A good example of such a system is the use of diethyl ether-$BF_3$ complex as a solvent for the catalytically active diisopropyl ether-$BF_3$ solid complex. This combined complex mixture is more effective than either diethyl ether-$BF_3$ or diisopropyl ether-$BF_3$ complexes alone, both of which are catalytically active. This type of system works extremely well and prevents dilution of the catalyst by the solvent. It should be noted that diethyl ether does not function as an activator when the $BF_3$ is used in the gaseous phase as a catalyst as in the prior art.

Inorganic polar compounds, such as water, have been studied with regard to their catalyst modifying effects. Water has an activating effect on $BF_3$ but has certain detrimental effects on the product and in the process when used in the reaction mixture. Water is not soluble in a liquid propylene feed. When water is used alone for activation, increased corrosion of metal apparatus occurs. Water makes the product dark in color and difficult to purify. Very small amounts of water may be present satisfactorily with the polar organic compounds used to control the polymerization.

The advantages of this invention reside in the better catalyst efficiency obtained i. e., the best previously obtained figure for propylene polymerization with $BF_3$ catalyst in the gaseous form was roughly about 25 grams of polymer per gram of $BF_3$. With a liquid catalyst complex, efficiencies as high as 79 grams of $BF_3$ have been obtained.

Another advantage of this invention is the ease of recovery and recycling of the liquid catalyst complex as compared to a vapor phase operation. Any gaseous $BF_3$ is recovered by adsorption in the complex forming material. $BF_3$ losses thus become negligible.

Another advantage is the complete and rapid phase separation of the hydrocarbons from the liquid catalyst complex. In spite of the tendency for similar systems to emulsify a clear, sharp separation of the liquid catalyst complex and hydrocarbon phase occurs even under highly turbulent conditions, especially when the diethyl ether-$BF_3$-diisopropyl ether complex is used. The loss of catalyst due to carry-over in the polymer is very small.

Another advantage is the recovery of the $BF_3$ gases from the reactor in directly usable form.

Still another advantage is that the $BF_3$ liquid catalyst complex is much more easily handled than a gaseous catalyst.

It is to be understood that the invention is not limited to the specific examples which have been offered merely as an illustration and that modifications may be made within the scope of the claim without departing from the spirit of the invention.

What is claimed is:

A process for selective liquid phase polymerization of propylene to produce predominantly $C_9$ through $C_{24}$ polyproylene polymers which comprises contacting propylene in the liquid phase at a temperature of 0° to 91.4° C., at superatmospheric pressures with a liquid polymerization catalyst solution consisting essentially of a complex of $BF_3$ and diisopropyl ether dissolved in a complex of $BF_3$ and diethyl ether, said catalyst solution being present in an amount sufficient to effect rapid separation of the polypropylene polymers and unreacted liquid propylene from the liquid catalyst solution, simultaneously supplying additional BF₃ to the polymerization reaction mixture, continuously withdrawing the reaction mixture to a phase separation zone, and settling the reaction mixture to effect rapid and complete phase separation of the polypropylene polymers and any unreacted liquid propylene from the liquid catalyst solution.

CARL S. CARLSON.
  ROBERT S. MERRINGTON.
  FRANK A. BIRIBAUER.

REFERENCES CITED

The following references are of record in the file of this patent:

UNITED STATES PATENTS

| Number | Name | Date |
|---|---|---|
| 2,182,617 | Michel | Dec. 5, 1939 |
| 2,357,926 | Bannon | Sept. 12, 1944 |
| 2,379,656 | Ruthruff | July 3, 1945 |
| 2,477,290 | Dornte et al. | July 26, 1949 |
| 2,488,752 | Wackher et al. | Nov. 22, 1949 |

FOREIGN PATENTS

| Number | Country | Date |
|---|---|---|
| 801,883 | France | Aug. 20, 1936 |